US011213029B2

United States Patent
Lee et al.

(10) Patent No.: US 11,213,029 B2
(45) Date of Patent: Jan. 4, 2022

(54) COMPOSITION FOR PLANT DISEASE CONTROL COMPRISING LIMONENE DERIVATIVES AS ACTIVE INGREDIENTS

(71) Applicant: KOREA ATOMIC ENERGY RESEARCH INSTITUTE, Daejeon (KR)

(72) Inventors: Sungbeom Lee, Gwangju (KR); Gun Woong Lee, Jeollabuk-do (KR); Kwangwoo Jung, Seoul (KR); Byung Yeoup Chung, Jeollabuk-do (KR); Seungsik Lee, Jeongeup-si (KR); Jin-Hong Kim, Jeongeup-si (KR); Hyoungwoo Bai, Jeongeup-si (KR); Yong-Dae Park, Jeongeup-si (KR)

(73) Assignee: KOREA ATOMIC ENERGY RESEARCH INSTITUTE, Daejeon (KR)

( * ) Notice: Subject to any disclaimer, the term of this patent is extended or adjusted under 35 U.S.C. 154(b) by 46 days.

(21) Appl. No.: 16/619,434

(22) PCT Filed: Jun. 7, 2018

(86) PCT No.: PCT/KR2018/006472
§ 371 (c)(1),
(2) Date: Dec. 4, 2019

(87) PCT Pub. No.: WO2018/226042
PCT Pub. Date: Dec. 13, 2018

(65) Prior Publication Data
US 2020/0205407 A1 Jul. 2, 2020

(30) Foreign Application Priority Data

Jun. 7, 2017 (KR) .................. 10-2017-0070991
Jun. 5, 2018 (KR) .................. 10-2018-0064758

(51) Int. Cl.
*A01N 43/20* (2006.01)
*A01N 35/06* (2006.01)
(Continued)

(52) U.S. Cl.
CPC .............. *A01N 43/20* (2013.01); *A01N 31/06* (2013.01); *A01N 31/08* (2013.01); *A01N 35/06* (2013.01); *C05F 11/00* (2013.01)

(58) Field of Classification Search
None
See application file for complete search history.

(56) References Cited

U.S. PATENT DOCUMENTS

| 5,110,832 A * | 5/1992 | Chastain .................. A61L 2/16 514/729 |
| 5,308,873 A | 5/1994 | Chastain et al. |
| 2011/0008475 A1 | 1/2011 | Sardo |

FOREIGN PATENT DOCUMENTS

| CN | 101911949 A | 12/2010 |
| CN | 102972397 | 3/2013 |

(Continued)

OTHER PUBLICATIONS

Nguefack, J.; et al. "Fungicidal potential of essential oils and fractions from C. citratus . . . " J. Essent. Oil Res., 2007, 19, 581-587 (Year: 2007).*

(Continued)

*Primary Examiner* — Melissa S Mercier
(74) *Attorney, Agent, or Firm* — Klarquist Sparkman, LLP

(57) ABSTRACT

The present invention relates to a composition for controlling plant diseases containing a limonene derivative as an active ingredient. In the present invention, the limonene derivatives have an effect of inhibiting the growth of *Xanthomonas oryzae* pv. *Oryzae* (*Xoo*), which is a pathogen (Continued)

mediating bacterial leaf blight, and *Magnaporthe oryzae*, which is a pathogen mediating rice blast, and it was confirmed in an experiment with respect to inhibition using volatility (i.e., in a state not being in direct contact with *Xoo* or *M. oryzae*) that the limonene derivatives have a growth inhibitory effect. Accordingly, the limonene derivatives have an inhibitory effect against the growth of *Xoo* and thus they can be effectively used as a composition for controlling plant diseases.

13 Claims, 6 Drawing Sheets

(51) Int. Cl.
  *C05F 11/00* (2006.01)
  *A01N 31/06* (2006.01)
  *A01N 31/08* (2006.01)

(56) References Cited

FOREIGN PATENT DOCUMENTS

| | | |
|---|---|---|
| CN | 103650835 A | 3/2014 |
| CN | 106879637 A | 6/2017 |
| JP | 2001-316214 | 11/2001 |
| JP | 2005-536495 | 12/2005 |
| JP | 2010-115162 | 12/2012 |

OTHER PUBLICATIONS

Aguiar, R. W. de S. et al. "Fumigant antifungal activity of . . ." The Scientific World Journal, 2014, 8 pg. (Year: 2014).*
Mycocosm (https://mycocosm.jgi.doe.gov/Magor1/Magor1.home.html), no date available, no pagination.*
Jabeen (Pak. J. Bot., 2011, 43, 111-118) (Year: 2011).*
Of Bajpai et al. (J. Am. Oil. Chem. Soc., 2010, 87, 1341-1349) (Year: 2010).*
Bayan et al. (Cien. Inv. Agr., 2018, 45(1), 64-69) (Year: 2018).*
Jana (Pharmacogn Rev. 2010, 4(8), 179-184).*
Aguiar et al. (The Scientific World, 2014, 8 pg.) (Year: 2014).*
Mandal et al. (Asian Pacific Journal of Tropical Biomedicine, 2015, 5(6), 421-428) (Year: 2015).*
Mycocosm (https://mycocosm.jgi.doe.gov/Magor1/Magor1.home.html). (Year: 2021).*
Kotan et al. "Screening of Antibacterial Activities of Twenty-One Oxygenated Monoterpenes" *Z Naturforsch C J Biosci*. 62c:507-513 (2007).
Yoon et al. "Recent Trends in Studies on Botanical Fungicides in Agriculture" *Plant Pathology Journal* 29(1): 1-9 (2013).
Lee et al. "Direct suppression of a rice bacterial blight (*Xanthomonas oryzae* pv. oryzae) by monoterpene (s)-limonene" *Photoplasma* 253(3):683-690 (2015).
Yun, Development status and selection guide of Biological Pesticides in my country [China], *Market Information of Pesticide* 6: 55-57 (Jul. 29, 2014) (w/English translation).
Liang, "Study on the Synthesis and Biological Activity of citral and limonene oxime ester compounds", DAN Liang, "Agricultural Science and Technology in Chinese Master's theses Full-text Database", Issue S1, 2011, pp. D046-205 (Dec. 15, 2011) (w/English translation).
Dadasoglu et al., "Antibacterial actives of extract and essential oils of three *Origanum* species against plant pathogenic bacteria and their potential use as seed disinfectants," *Journal of Plant Pathology* 93(2): 271-282 (2011).
De S. Aguiar et al., "Fumigant antifungal activity of *Corymbia citriodora* and *Cymbopogon nardus* essential oils and citronellal against three fungal species," *The Scientific World Journal* vol. 2014, article 492138, 8 pages (Jan. 30, 2014).
Lia et al., "Study on the antibacterial activity of L-terpineol against plant pathogens", Chemical Technology and Development/Technology & Development of Chemical Industry, vol. 36, Issue 12, pp. 5-7 (Dec. 15, 2007), with English abstract.
Kandhari et al., "Management of sheath blight of rice through essential oils, aroma compounds and plant extracts," *Indian Phytopathology* 63(2): 99-202 (2010).
Kotan et al., "Screening of antibacterial activities of twenty-one oxygenated monoterpenes," *Verlag der Zeitschrift für Naturforschung* 262(7/8): 507-513 (Jan. 29, 2007).
Moghaddam et al., "Chemical composition and antibacterial activity of essential oil of *Ocimum ciliatum*, as a new source of methyl chavicol, against ten phytopathogens," *Industrial Crops and Products* 59: 144-148 (2014).
Saito et al., "The biological properties of monoterpenes hypotensive effects on rats and antifungal activities on plant pathogenic fungi of monoterpenes," *Mokuzai Gakkaishi* 42(7): 677-680 (1996).
Tosa and Chuma, "Classification and parasitic specialization of blast fungi," *Jpn. J. Phytopathol.* 80 (Special Issue): 32-39 (2014) (w/English Abstract).
Vijayakumar et al., "Phytochemical analysis and in vitro antimicrobial activity of *Illicium griffithii* Hook. f. & Thoms extracts," *Asian Pacific Journal of Tropical Disease* 2012: 190-199 (e-PUB Jun. 28, 2012).
Wang et al., "Antimicrobial and antioxidant activities of the root bark essential oil of *Periploca sepium* and its main component 2-hydroxy-4-methoxybenzaldehyde," *Molecules* 15: 5807-5817 (2010).
Yoon et al., "Recent trends in studies on botanical fungicides in agriculture," *Plant Pathology Journal* (Seoul, Republic of Korea) 29(1): 1-9 (2013).

\* cited by examiner

[Fig. 1]
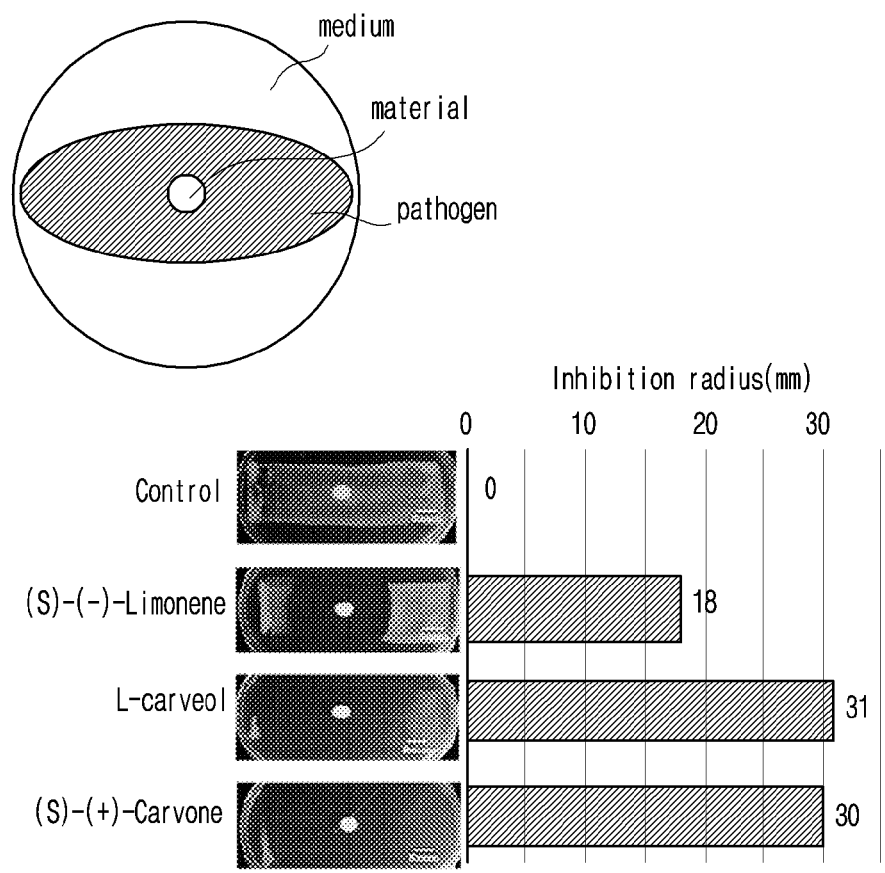

[Fig. 2]
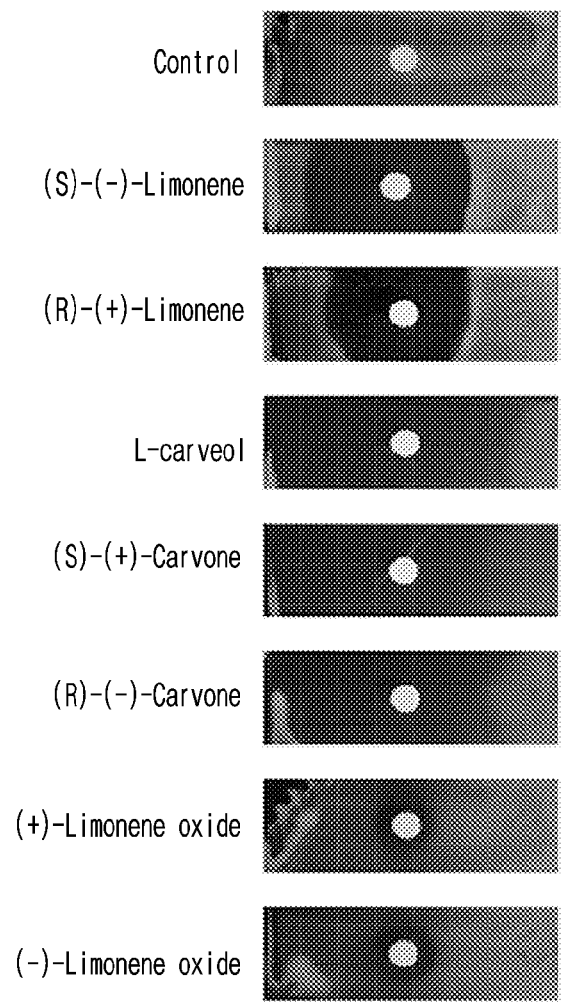

[Fig. 3]
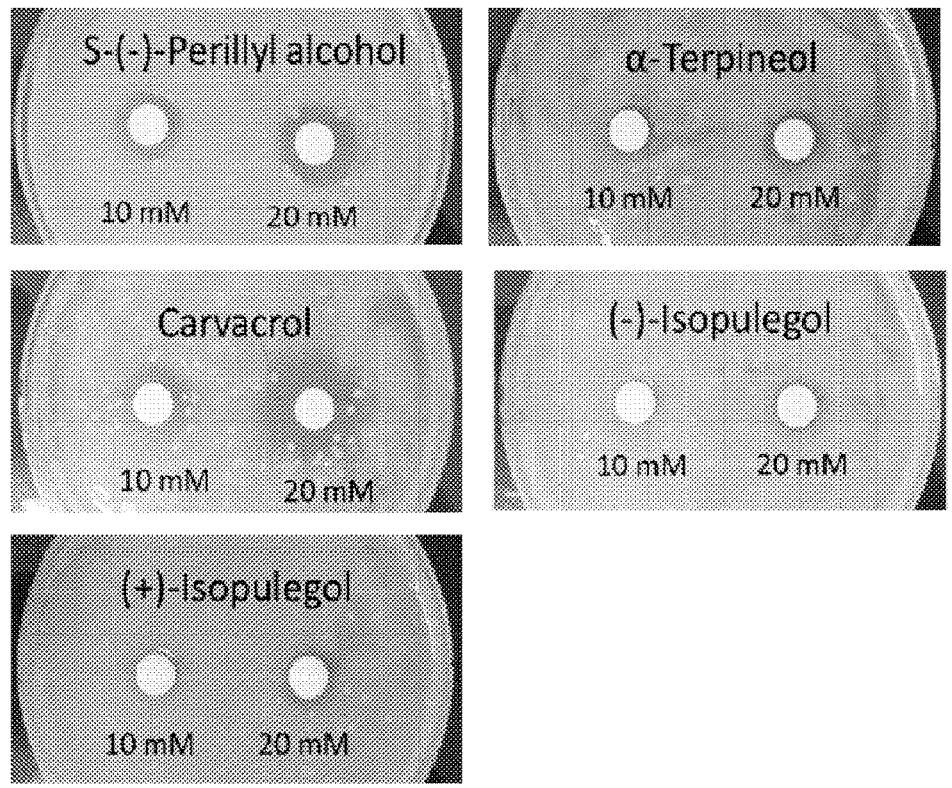
[Fig. 4]
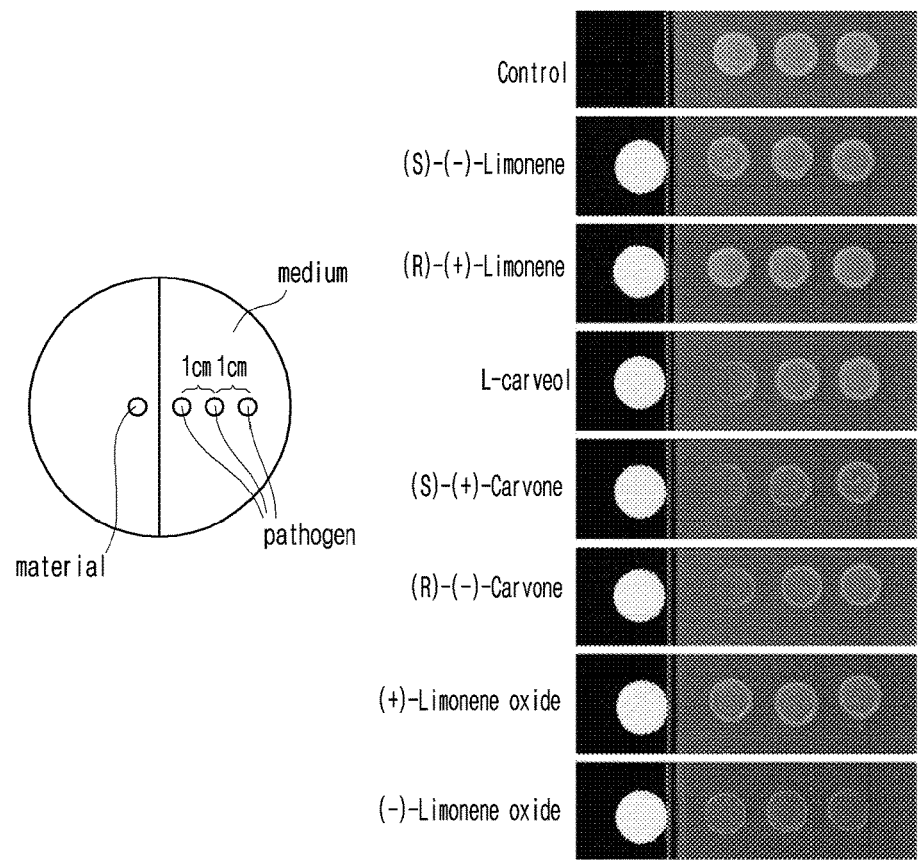

[Fig. 5]

| | Treatment | Xanthomonas axonopodis | Xanthomonas fragariae | Xanthomonas oryzae |
|---|---|---|---|---|
| 1 | Control | | | |
| 2 | (S)-(-)-Limonene | | | |
| 3 | L-carveol | | | |
| 4 | (S)-(+)-Carvone | | | |
| 5 | (S)-(-)-Limonene + L-carveol | | | |
| 6 | (S)-(-)-Limonene + (S)-(+)-Carvone | | | |
| 7 | L-carveol + (S)-(+)-Carvone | | | |
| 8 | (S)-(-)-Limonene + L-carveol + (S)-(+)-Carvone | | | |

[Fig. 6]
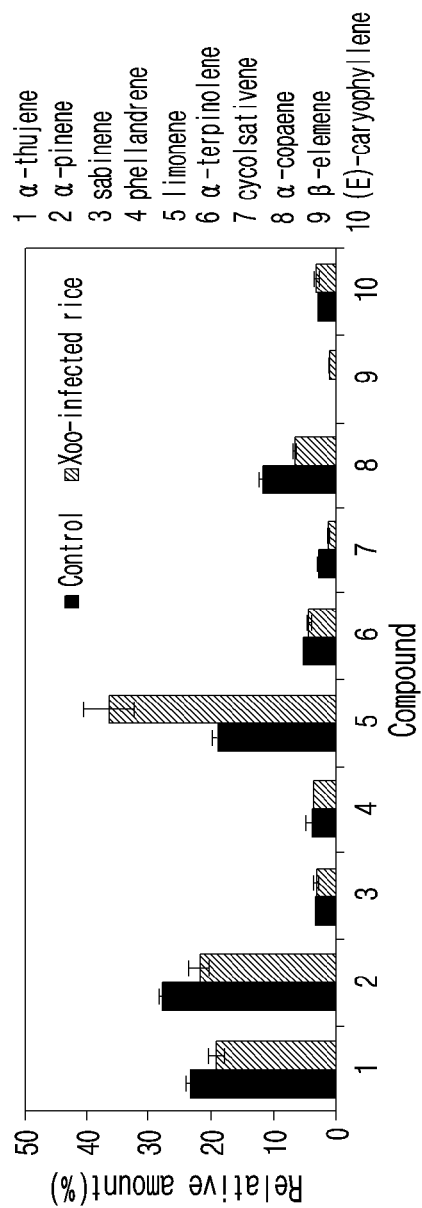

[Fig. 7]
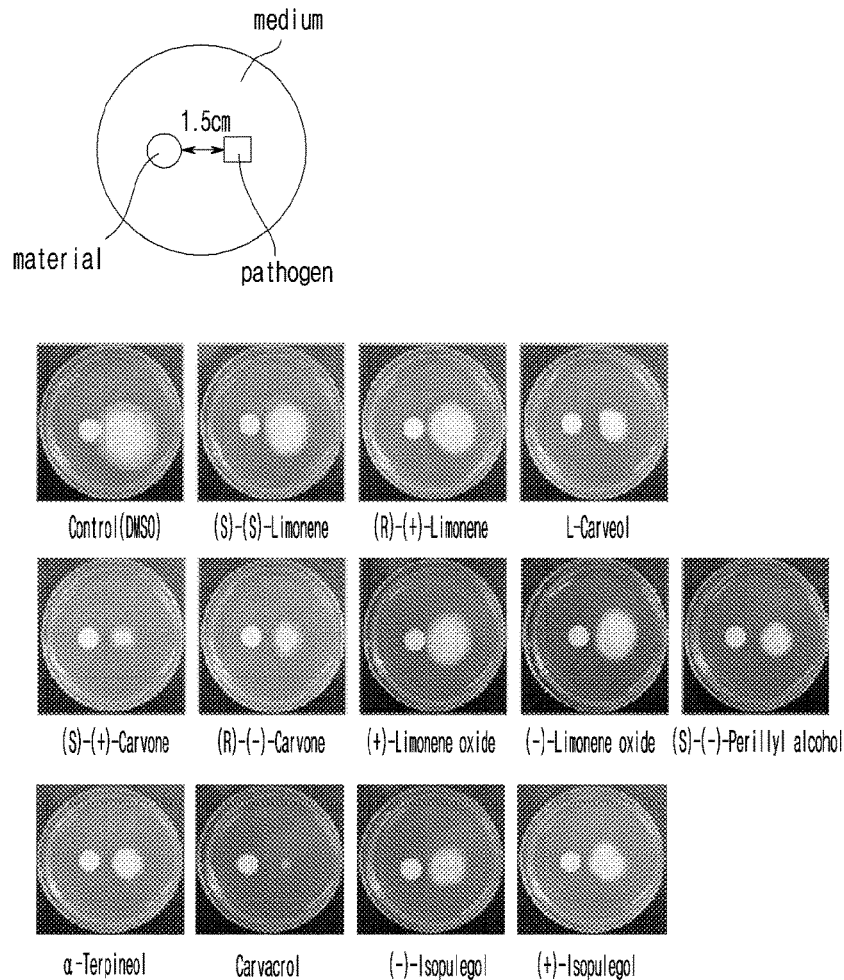
[Fig. 8]
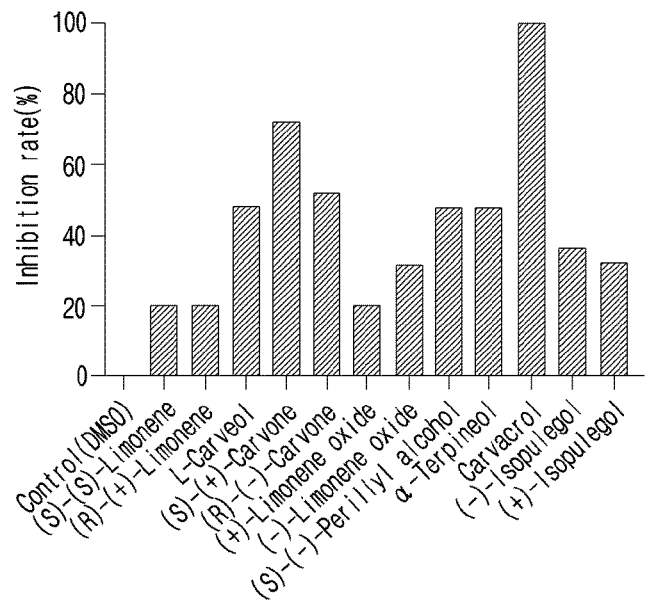

COMPOSITION FOR PLANT DISEASE CONTROL COMPRISING LIMONENE DERIVATIVES AS ACTIVE INGREDIENTS

CROSS REFERENCE TO RELATED APPLICATIONS

This is the § 371 U.S. National Stage of International Application No. PCT/KR2018/006472, filed Jun. 7, 2018, which in turn claims the benefit of Korean Patent Application No. 10-2017-0070991, filed Jun. 7, 2017 and Korean Patent Application No. 10-2018-0064758, filed Jun. 5, 2018, all of which applications are incorporated by reference herein in their entirety.

TECHNICAL FIELD

The present disclosure relates to a composition for controlling plant diseases using a limonene derivative.

BACKGROUND ART

Rice is a plant of the class Monocotyledon, the order Glumineae, and the family Poaceae, and 23 different species have been known. Among these, the cultivars can be divided into *Oryza sativa*, which is cultivated mainly in Asia and widely spread worldwide, and *Oryza glaberrima*, which is cultivated in a part of West Africa. *Oryza sativa* can be divided largely into *Oryza sativa* ssp. *indica* group, which is cultivated in Southeast Asia including India and the Yangtze River in China, and *Oryza sativa* ssp. *japonica*, which is cultivated in Northeast Asia such as north of the Yangtze River, Korea, and Japan. More than half of the world population eats rice as a staple food, and in Asia, 40 to 70% of the calories consumed by food are from rice, and thus rice is a socially and economically important crop. Despite the significant progress in rice harvesting over the past three decades through the Green Revolution, there has been a loss in rice yield due to various kinds of natural disasters and diseases.

The major diseases that occur in rice are rice blast, rice sheath blight, rice bacterial leaf blight, etc. Rice bacterial leaf blight is a disease induced by a pathogenic fungus, *Magnaporthe oryzae*, which belongs to Deuteromycetes. When rice is infected with the pathogen, small dark green spots are first formed on the leaves, and they gradually grow to become a fusiform lesion in which the inside is grayish white, the periphery is reddish brown, and the outer periphery of the lesion is yellow. In severe cases, the lesion is significantly expanded while maintaining its dark green color, thereby forming greenish powdery spores (conidium) on the back of the lesion.

Meanwhile, rice bacterial leaf blight is a bacterial disease caused by the pathogenic bacteria of rice bacterial leaf blight (*Xanthomonas oryzae*), which is a kind of gram-negative bacillus. The rice infected with rice bacterial leaf blight pathogens shows leaf blight symptoms and eventually it is burned white and become withered.

Rice bacterial leaf blight occurs in the area of Asia, Australia, the United States, etc., and in particular, the damage induced by rice bacterial leaf blight is very serious especially in Southeast Asia. Being first discovered in Fukuoka area in 1884, rice bacterial leaf blight was confirmed to be a disease caused by bacteria in 1911, and in recent years, this pathogen has been renamed as *Xanthomonas oryzae* pv. *oryzae* through the analyses of fatty acids and cell proteins and its name has been used until now. The first case report of rice bacterial leaf blight in Korea was in Haenam province, Jeollanam-do in 1930, and the area with incidence of the rice bacterial leaf blight had been limited to some parts of the southern part of Korea until 1960, and then the area with incidence of this disease were expanded nationwide due to the expanded cultivation of "Geumnampung", which is a susceptible species to rice bacterial leaf blight. The rice bacterial leaf blight was considered to be one of the three major diseases in rice, by showing not only its occurrences in leaves during the later stage of cultivation, but also showing the leaf blight forming symptoms that occurs after the transplanting, thus causing a loss of about 20% to 30%, and up to 80% of the yield.

In Korea, early infectious agents are wintering due to the presence of a winter season, and thus *X. oryzae* pv. *oryzae* can survive in soils, weeds, dry rice straws, seeds, etc. for up to one year, they are usually killed before a new farming season comes. However, wintering of early infectious agents is often observed in the susceptible seeds or embryos, and subsequently, latent pathogens are transferred to the rice field by irrigation water and infect rice, and then pathogens multiply in the infected leaves and often become secondary infectious agents. Among the weeds that are commonly found in waterways and reservoirs, when *Leersia* or *Leersia japonica* are in conditions being or not being able to cause the occurrence of a disease by pathogens, the bacteria flocculate around the roots of these weeds and enter the winter. When the irrigation water after thawing is flowed into the rice paddies, the bacteria flocculated around the roots are propagated by water and become the primary infectious source. Additionally, when the pathogens wintered inside of the dry rice straw (rice hull) that was infected in the previous year, these can be released into the rice paddies and become the primary infectious agents when they are sprayed on the rice fields. The pathogens which flowed into the soil by host plants or irrigation water gradually proliferate, penetrate into the water lines or pores of the leaves in contact with the water when the rice is transplanted and form lesions, and the pathogens which are released to the outside from the lesions or the released pathogens fall off into the paddy field or healthy leaves come into contact with the lesions to be infected. Where the pathogens penetrated into the leaves and formed lesions, many bacteria leak to the outside and become the second infectious source, and the spread of the disease is accelerated. Additionally, weather conditions such as typhoons and floods promote the occurrence of diseases. Typhoons can cause a lot of damage to rice leaves by strong winds, whereby pathogens can invade through the wounds caused and weaken the resistance, thereby promoting the onset of the disease. Many bacteria released from the lesions promote the contact with healthy leaves, and the pathogens released to the outside by the typhoon-accompanying rain may be scattered more than 50 m by the wind and become an infectious source.

At present, as a method for controlling the infectious source, it is very important to thoroughly manage the pavement such as the removal of host weeds from the rice paddies and waterways and the drainage system before crop reforestation, so as to eliminate the primary infectious agents. In areas of frequent occurrences or areas with a risk of occurrences every year, the cultivation of susceptible species is avoided and resistant species are planted for the fundamental prevention of the occurrence of diseases. Bacterial diseases are mostly transmitted by water as a mediator, and thus, it is necessary that lowlands are not flooded during floods or water be drained as soon as possible if water is flooded, so as to minimize the blocking with pathogens. In the case of control by drugs, the controlling effect by drug penetration is not high because rice bacterial leaf blight can grow only in the ducts of a host plant and thus the diseases are currently avoided by cultivating and nurturing of completely resistant cultivars. However, this cannot be a practical solution and has a limitation in that consumers' preferences are limited due to the limited supply of species. However, most drugs used for control are chemically-synthesized and these drugs have problems in that they have a negative impact on public health such as human and livestock in the case of a widespread use, are not environmentally-friendly, and raise concerns about the appearance of resistance in the pests. Accordingly, there is a demand for the environment-friendly active materials of natural components that can replace synthetic materials.

In the past, secondary metabolites in the plants were treated as metabolites to be simply excreted. However, recently, it has become increasingly apparent that secondary metabolites have an important role between plants and research on this area is becoming more important. In particular, unlike primary metabolites (sugars, fatty acids, amino acids, etc.) indispensable for the growth and development of plants, secondary metabolites such as alkaloids, phenols, terpenoids, etc. are additive materials and thus they do not significantly affect the growth of plants. Plants are biosynthesizing these secondary metabolites for self-defense, ecological interaction, etc. and they are called allelopathy. Depending on the materials synthesized and secreted or accumulated in a plant, the allelopathy may appear in the form of promoting and inhibiting the growth of specific plants or microorganisms, these materials are called allelochemicals and can be used as natural pesticides.

KR Reg. Pat. No. 10-0741866 discloses a composition that reduces the growth competition between crops and weeds through inhibiting seed germination of weeds via allelopathy. Most of these allelochemicals are contained in plant parts (i.e., leaves, stems, roots, flowers, fruits, and seeds), and the main materials are largely classified into toxic gases, organic acids and aldehydes, aromatic acids, unsaturated lactones, coumarins, quinones, flavonoids, tannins, alkaloids, terpenes, steroids, unknown materials, etc. They affect neighboring plants and microorganisms by various pathways, such as accumulation in the plant, secretion through the roots, volatility through the topical tissues such as leaves, elution of the allelochemicals due to rainfall, etc.

In this regard, the present inventors have confirmed that when rice is inoculated with *Xanthomonas oryzae* pv. *oryzae* (*Xoo*), which is a pathogen mediating rice bacterial leaf blight, biosynthesis of terpene (i.e., a plant-derived antimicrobial material) is increased from the inoculated rice, and in particular, limonene is increased most among the terpenes, and have confirmed that limonene and derivatives thereof have an excellent effect of inhibiting growth of *Xoo* or *M. oryzae*, thereby completing the present invention.

DISCLOSURE OF INVENTION

Technical Problem

One object of the present invention is to provide a composition for controlling plant diseases containing a limonene derivative as an active ingredient.

Solution to Problem

In order to achieve the objects, the present invention provides compositions, which contain limonene derivatives of Formula 1 to Formula 10 below as an active ingredient, for controlling a plant disease.

-continued

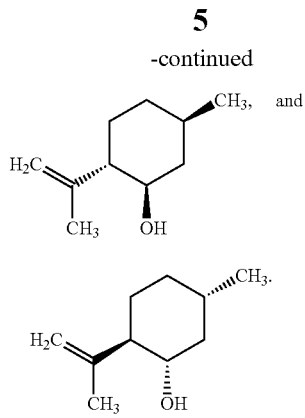
[Formula 9]
and

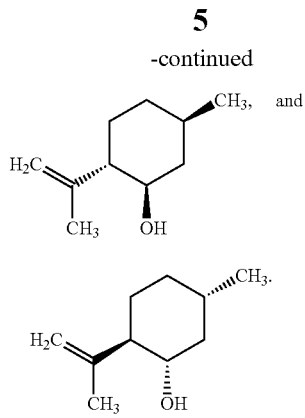
[Formula 10]

Additionally, the present invention provides methods for controlling plant diseases using limonene derivatives.

Advantageous Effects of Invention

The limonene derivatives of the present invention have an effect of inhibiting the growth of *Xanthomonas oryzae* pv. *oryzae* (*Xoo*) (i.e., a pathogen mediating bacterial leaf blight, or *Magnaporthe oryzae* (i.e., a pathogen mediating rice blast). The limonene derivatives inhibit the growth of these pathogens by not only direct contact with pathogens but also indirect contact (i.e., volatilization) with pathogens.

BRIEF DESCRIPTION OF DRAWINGS

FIG. 1 shows the effects of limonene and limonene derivatives (i.e., carveol and carvone) on direct inhibition of the growth of *Xanthomonas oryzae*; pv. *oryzae* (*Xoo*).

FIG. 2 shows the effects of limonene and limonene derivatives (i.e., S-(−)-limonene, R-(+)-limonene, L-carveol, S-(+)-carvone, R-(−)-carvone, (+)-limonene oxide, and (−)-limonene oxide) on direct inhibition of the growth of *Xoo*.

FIG. 3 shows the effects of (S)-(−)-perillyl alcohol, α-terpineol, carvacrol, (−)-isopulegol, and (+)-isopulegol on the inhibition of growth of *Xoo*.

FIG. 4 shows the effects of limonene and limonene derivatives (i.e., S-(−)-limonene, R-(+)-limonene, L-carveol, S-(+)-carvone, R-(−)-carvone, (+)-limonene oxide, and (−)-limonene oxide) on the inhibition of growth of *Xoo* by volatilization.

FIG. 5 shows the inhibitory effect of limonene and limonene derivatives (i.e., carveol and carvone) against the growth of pathogens of the genus *Xanthomonas* other than *Xoo*.

FIG. 6 shows the images representing the materials increased in the rice infected with *Xoo*.

FIG. 7 shows the effects of limonene, L-carveol, S-(+)-carvone, R-(−)-carvone, (+)-limonene oxide, (−)-limonene oxide, (S)-(−)-perillyl alcohol, α-terpineol, carvacrol, (−)-isopulegol, and (+)-isopulegol on the inhibition of growth of *Magnaporthe oryzae*.

FIG. 8 shows quantitative measurement of the effects of limonene, L-carveol, S(+)-carvone, R-(−)-carvone, (+)-limonene oxide, (−)-limonene oxide, (S)-(−)-perillyl alcohol, α-terpineol, carvacrol, (−)-isopulegol, and (+)-isopulegol on the inhibition of growth of *Magnaporthe oryzae*.

BEST MODE FOR CARRYING OUT THE INVENTION

Hereinafter, the present invention will be described in detail.

The present invention provides a composition for controlling a plant disease, which contains at least one limonene derivative selected from the group consisting of the compounds represented by Formula 1 to Formula 10 below as an active ingredient:

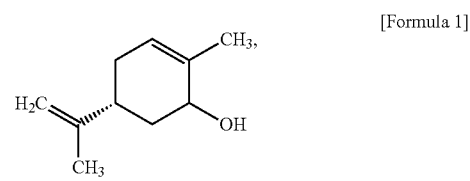
[Formula 1]

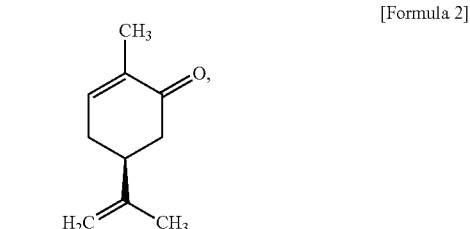
[Formula 2]

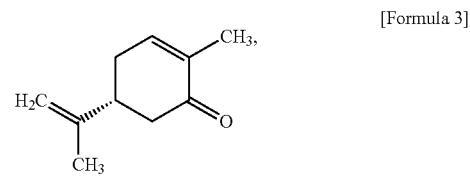
[Formula 3]

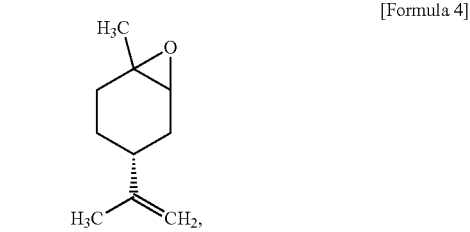
[Formula 4]

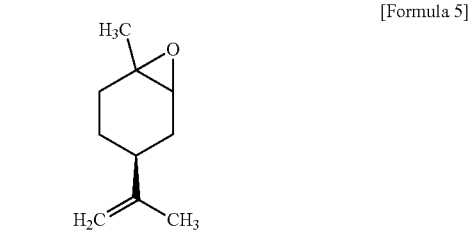
[Formula 5]

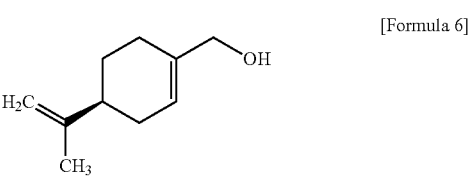
[Formula 6]

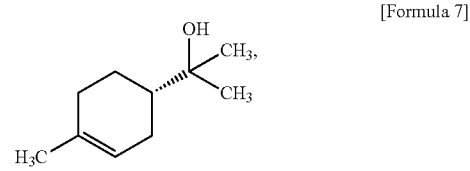
[Formula 7]

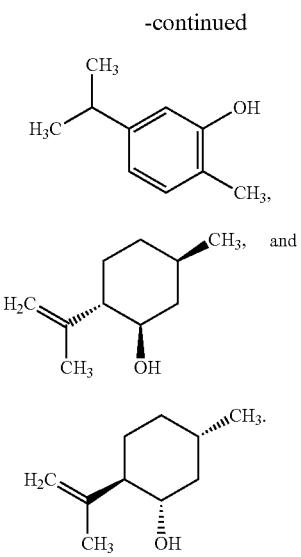

The above compounds are carveol, carvone, and limonene oxides, and specifically, L-carveol, S-(+)-carvone, R-(−)-carvone, (+)-limonene oxide, (−)-limonene oxide, (S)-(−)-perillyl alcohol, α-terpineol, carvacrol, (−)-isopulegol, and (+)-isopulegol. More specifically, Formula 1 represents L-carveol, Formula 2 represents S-(+)-carvone, Formula 3 represents R-(−)-carvone, Formula 4 represents a (+)-limonene oxide, Formula 5 represents a (−)-limonene oxide, Formula 6 represents a (S)-(−)-perillyl alcohol, Formula 7 represents α-terpineol, Formula 8 represents carvacrol, Formula 9 represents (−)-isopulegol, and Formula 10 represents (+)-isopulegol.

The above plant disease may be rice bacterial leaf blight or rice blast, and the rice bacterial leaf blight may be induced by *Xanthomonas oryzae* pv. *oryzae* (*Xoo*), but the induction of *Xanthomonas oryzae* pv. *oryzae* (*Xoo*) is not limited thereto, and the rice blast may be induced by *Magnaporthe oryzae*, but the induction of rice blast is not limited thereto.

The limonene derivative as an active ingredient may be contained at a concentration of 10 nM to 100 mM, but the concentration is not limited thereto.

The above compounds may be used in the form of an agro-pharmaceutically acceptable salt, and an alkali addition salt is useful as the salt to be used. The term "agro-pharmaceutically acceptable salt" refers to any organic or inorganic addition salt of alkali compounds of Formulas 1 of 10, which is in a concentration relatively that is not toxic to a subject to be treated and has a harmless effective action and does not deteriorate the advantageous effects of the alkali compounds of Formulas 1 to 10. These salts include alkali metal salts (e.g., sodium salt, potassium salt, etc.), alkaline earth metal salts (e.g., calcium salt, magnesium salt, etc.), etc. For example, alkaline, benzathine, calcium, choline, diethylamine, diol amine, glycine, lysine, magnesium, meglumine, olamine, potassium, sodium, tromethamine, zinc salt, etc. may be included.

Additionally, the compounds represented by Formulas 1 of 10 include not only agro-pharmaceutically acceptable salts, but also all of the hydrates and solvates which can be prepared by conventional methods.

The addition salt according to the present invention can be prepared by a conventional method. For example, the addition salt according to the present invention can be prepared by dissolving the compounds of Formulas 1 to 10 in a water miscible organic solvent (e.g., acetone, methanol, ethanol, acetonitrile, etc.), followed by precipitation or crystallization by adding an excess amount of an alkali. Then, an addition salt can be prepared by evaporating the solvent in the mixture followed by drying, or by subjecting the precipitated salt to suction filtration.

The limonene derivatives may be dissolved in any one or more selected from the group consisting of water, glycerin, propylene glycol, butylene glycol, pentylene glycol and sorbitol, mineral oil, lanolin oil, higher fatty acid, higher alcohol, ester oil, silicone oil, fluorine compound and other vegetable oil, mineral oil, animal oil, and synthetic oil.

The composition may be in the form of an aerosol-type spraying agent or a spraying agent for spray.

The composition may be one that can be used in a solid or gel form by adding a solidifying agent. The term "solid form" means that it does not have fluidity at least at room temperature, and in the present invention, the solid may mean that it does not have fluidity at a temperature of 60° C. or less. For solid formulations, the use of wax may be considered. When wax is mixed and cooled, a solid-type formulation having a high hardness while forming a fine three-dimensional crystal structure can be obtained. Additionally, when an oil gelling agent is mixed and dissolved in an oil and then cooled, a solid-type formulation having a high hardness while forming a fine three-dimensional crystal structure like the oil/wax formulation can be formed. Examples of the selectable solidifying agent, including the wax and oils, may include proteins or protein hydrolysates, cationic polysaccharides, modified starch, cellulosic and modified cellulose (e.g., hydroxypropyl cellulose, hydroxyethyl cellulose, carboxymethyl cellulose, ethylcellulose, methylcellulose, hydroxypropyl methylcellulose, and ethyl hydroxyethyl cellulose), amide pectin, nonionic polysaccharides, hydroxypropyl methylcellulose, propylene glycol alginate ester, gelatin, agar, phenol resin, urea, melamine, epoxy, polyester, silicone, rubber, polyisocyanate, polyamine, polyurethane, bioplastic, biodegradable thermosetting resin, biodegradable thermoplastic resin, polyvinyl alcohol, polyvinylpyrrolidone derivatives thereof, gums (e.g., gum arabic, xanthan gum, guar gum, carrageenan, and alginate), and a polyoxyethylene polyoxypropylene copolymer.

The composition for controlling plant diseases according to the present invention may be a simple mixture of limonene derivatives. As an alternative, the composition for controlling plant diseases may be prepared by mixing limonene derivatives with an inert carrier, and adding surfactants and other necessary supplementary agents to the mixture, so that the mixture can be formulated into an emulsion, an emulsion, a fluidizing agent, wettable powder, granulated wettable powder, powders, granules, etc. In the present invention, the above-mentioned composition for controlling plant diseases itself may be used as an agent for treating seeds by adding another inert ingredient.

Examples of liquid carriers that can be used in formulations may include water; alcohols such as methanol and ethanol; ketones, such as acetone and methyl ethyl ketone; aromatic hydrocarbons such as benzene, toluene, xylene, ethylbenzene and methylnaphthalene; aliphatic hydrocarbons such as hexane, cyclohexane, kerosene, and light oil; esters such as ethyl acetate and butyl acetate; nitriles, such as acetonitrile and isobutyrnitrile; ethers such as diisopropyl ether and dioxane; acid amides such as N, N-dimethylformamide and N, N-dimethylacetamide; halogenated hydrocarbons such as dichloromethane, trichloroethane, and carbon tetrachloride; dimethyl sulfoxide; and vegetable oils such as soybean oil and cottonseed oil.

Examples of solid carriers that can be used in the formulation may include fine powders or granules such as minerals (e.g., kaolin clay, attapulgite clay, bentonite, montmorillonite, acid white clay, pyrophyllite, talc, diatomite, and talcite); natural organic materials such as corn leaf powder and walnut shell powder; synthetic organic materials such as urea; salts such as calcium carbonate and ammonium sulfate; synthetic inorganic materials such as synthetic hydrated silicon oxide; as the liquid carrier, aromatic hydrocarbons such as xylene, alkylbenzene, and methylnaphthalene; alcohols such as 2-propanol, ethylene glycol, propylene glycol, and ethylene glycol monoethyl ether; ketones such as acetone, cyclohexanone, and isophorone; vegetable oils such as soybean oil and cottonseed oil; petroleum aliphatic hydrocarbons, esters, dimethylsulfoxide, acetonitrile, and water.

Examples of surfactants may include anionic surfactants such as alkyl sulfate ester salts, alkyl aryl sulfonate salts, dialkyl sulfosuccinate salts, polyoxyethylene alkyl aryl ether phosphate ester salts, lignosulfonate salts, and naphthalenesulfonate formaldehyde polycondensates; and nonionic surfactants such as polyoxyethylene alkyl aryl ethers, polyoxyethylene alkyl polyoxypropylene block copolymers, and sorbitan fatty acid esters; and cationic surfactants such as alkyltrimethylammonium salts.

Examples of other supplemental agents may include water-soluble polymers such as polyvinyl alcohol and polyvinylpyrrolidone; polysaccharides such as gum arabic, alginic acid and salts thereof, carboxymethyl-cellulose (CMC), and xanthan gum; inorganic materials such as aluminum magnesium silicate, alumina sol, preservatives, and colorants; and stabilizers such as isopropyl acid phosphate (PAP) and butylhydroxytoluene (BHT).

The composition may be one that has a continuous control effect by volatilization of the limonene derivatives into the air.

In a specific embodiment of the present invention, it was confirmed that the limonene derivatives (i.e., L-carveol, S-(+)-carvone, R-(−)-carvone, (+)-limonene oxide, (−)-limonene oxide, (S)-(−)-perillyl alcohol, α-terpineol, carvacrol, (−)-isopulegol, and (+)-isopulegol) have an effect of directly inhibiting the growth of (*Xoo*) (FIGS. 2 and 3), and that the limonene derivatives show the inhibitory effect against *Xoo* even through volatility in a case where there is no direct contact (FIG. 4), and that the limonene derivatives particularly show excellent inhibitory effect against the growth of *Xoo* compared to other pathogens of the genus *Xanthomonas* (FIG. 5). Additionally, L-carveol, S-(+)-carvone, R-(−)-carvone, (+)-limonene oxide, (−)-limonene oxide, (S)-(−)-perillyl alcohol, α-terpineol, carvacrol, (−)-isopulegol, and (+)-isopulegol have also showed the effect of inhibiting the growth of *Magnaporthe oryzae* (see FIGS. 7 and 8).

Accordingly, the compounds represented by Formula 1 to Formula 10 may be effectively used for the composition for controlling plant diseases such as rice bacterial leaf blight and rice blast.

Additionally, the present invention provides a method for controlling plant diseases, which includes treating a plant infected with plant pathogens with the composition that contains at least one limonene derivative selected from the group consisting of the compounds represented by Formulas 1 to 10 as an active ingredient.

The limonene derivatives may be one or more selected from the group consisting of carveol, carvone, and limonene oxides, and specifically, L-carveol, S-(+)-carvone, R-(−)-carvone, (+)-limonene oxide, (−)-limonene oxide, (S)-(−)-perillyl alcohol, α-terpineol, carvacrol, (−)-isopulegol, and (+)-isopulegol.

The treatment may be a direct spray of the composition to a plant, on the soil in which the plant grows, or into a medium for cultivation of the plant.

The controlling method of the present invention includes the treatment of stems and leaves of a plant, the treatment of the place where the plant grows (e.g., soil), the treatment of seeds such as seed sterilization/seed coating, and the treatment of roots.

The plant disease may be rice bacterial leaf blight but the plant disease is not limited thereto, and the plant may be rice, but the plant is not limited thereto.

The treatment of stems and leaves as the control method of the present invention may particularly include the application on plant surfaces such as spraying on stems and leaves. The treatment of soils as the control method of the present invention may include, for example, spraying to the soil, mixing with soil, application of a liquid treatment to the soil (irrigation of the liquid treatment, injection into the soil, and loading of the liquid treatment), and examples of sites to be treated include planting holes, furrows, areas near the planting holes, areas near the planting furrow, whole surface of the growing area, areas between the soil and the plant, areas between roots, area below the stem of the plant, the main furrow, soil for growth, rice nursery, a box for rice cultivation, a tray for cultivation, and a seed bed. The treatment may be performed before spray, during spray, immediately after spray, during rice cultivation, before settling cultivation, during settling cultivation, and during growth after settling cultivation. In the soil treatment described above, the active ingredient may be simultaneously applied to the plant, or a solid fertilizer such as a paste fertilizer containing the active ingredient may be applied to the soil. The active ingredient may be mixed within the irrigation liquid, for example, may be injected into an irrigation facility (e.g., an irrigation tube, an irrigation pipe, a sprinkler, etc.), mixed in a flooding liquid between the furrows, or mixed in a water culture medium. As an alternative, the irrigation liquid and the active ingredient may be premixed, for example, may be used for treatment by suitable irrigation methods, including the irrigation methods described above and other methods such as spraying and flooding.

The volatilization treatment as the control method of the present invention is, for example, a method for protecting plants from pests and diseases by volatility of a composition for controlling plant diseases of the present invention, after spraying the composition in a medium such as the soil for the cultivation of a plant, a hydroponic culture medium for the cultivation of a plant, a seed bed, etc., and in addition, the composition may be placed around the plant so that the plant can be exposed to the volatile composition in a gas state.

The seed treatment as the control method of the present invention is, for example, a method for treating seeds so as to protect the seeds from pests and diseases using a composition for controlling plant diseases of the present invention. Specific examples the method may include a spray treatment method in which a suspension of the composition for controlling plant diseases of the present invention is atomized and sprayed onto the surface of seeds; a spray treatment method in which a wettable powder, an emulsion, a fluidizing agent, etc. of the plant disease controlling composition of the present invention are sprayed onto the surface of seeds surface as it is or after adding a small amount of water thereto; an impregnation treatment method in which the seeds are impregnated in a solution of the composition for controlling plant diseases of the present invention for a specific period of time; and a film coating method and a pellet coating process.

When plants or soils for plant growth are treated with the compounds according to the invention, the amount of the composition to be used for treatment may vary depending on the type of a plant to be treated, the type and frequency of the pest to be controlled, the form of the formulation, the duration of the treatment, weather conditions, etc.

Emulsions, wettable powders, fluidizing agents, etc. are usually diluted with water and then sprayed for treatment. In this case, the concentration of the active ingredient is usually in the range of 0.0001 wt % to 3 wt %, and preferably 0.0005 wt % to 1 wt %. Powders, granules, etc. are usually used for treatment without dilution.

The controlling method of the present invention can be used in a cultivated land such as rice paddies or in a non-cultivated land.

In a specific embodiment of the present invention, it was confirmed that the limonene derivatives (i.e., L-carveol, S-(+)-carvone, R-(−)-carvone, (+)-limonene oxide, (−)-limonene oxide, (S)-(−)-perillyl alcohol, α-terpineol, carvacrol, (−)-isopulegol, and (+)-isopulegol) have an effect of directly inhibiting the growth of (*Xoo*) (FIGS. 2 and 3), and that the limonene derivatives show the inhibitory effect against *Xoo* even through volatility in a case where there is no direct contact (FIG. 4), and that the limonene derivatives particularly show excellent inhibitory effect against the growth of *Xoo* compared to other pathogens of the genus *Xanthomonas* (FIG. 5). Additionally, L-carveol, S-(+)-carvone, R-(−)-carvone, (+)-limonene oxide, (−)-limonene oxide, (S)-(−)-perillyl alcohol, α-terpineol, carvacrol, (−)-isopulegol, and (+)-isopulegol have also showed the effect of inhibiting the growth of *Magnaporthe oryzae* (see FIGS. 7 and 8).

Accordingly, any one or more limonene derivatives selected from the group consisting of the compounds represented by Formula 1 to Formula 10 can be effectively used in the method for controlling plant diseases such as rice bacterial leaf blight and rice blast.

Additionally, the present invention provides a fertilizer which contains any one or more limonene derivatives selected from the group consisting of the compounds represented by Formula 1 to Formula 10 as an active ingredient.

Additionally, the present invention provides a pesticide formulation which contains any one or more limonene derivatives selected from the group consisting of the compounds represented by Formula 1 to Formula 10 as an active ingredient.

Hereinafter, the present invention will be described in detail with reference to Examples.

The following Examples and Experimental Examples are provided only for illustrating the present invention, but the present invention is not limited by these Examples and Experimental Examples.

MODE FOR THE INVENTION

Example 1. Analysis of Antimicrobial Materials in Rice by Inoculation of Rice Bacterial Leaf Blight-Mediating Bacteria Example 1-1. Induction of Infection of Bacterial Leaf Blight in Rice The pathogenic bacteria causing rice bacterial leaf blight (*Xanthomonas oryzae* pv. *oryzae*) were maintained in YGC (ATCC 459: glucose 5.0%, yeast extract 0.5%, $CaCO_3$ 1.25%, and agar 1.5%) plate medium, and a small amount of the bacterial population was cultured in 10 mL nutrient broth (peptone 0.5%, beef extract 0.3%) in a shaking water bath at 28° C. (180 rpm) for 48 hours. The culture was dispersed in sterile distilled water at a 1:1 ratio and diluted for use to an absorbance of 1.0 at 595 nm.

The culture bacterial liquid was inoculated with scissors on a rice plant grown on a Murashige and Skoog (MS) solid medium in a sterile transparent box at 28° C. under 24 hour light-dark cycle conditions (14 hours under light condition/ 10 hours under dark condition) for 1 week, and then cultured under the same conditions for 7 days. After incubation, the occurrence of the disease was examined and confirmed the disease symptoms by comparing the inoculated area with those of the control group.

Example 1-2. Comparison of Materials Produced in Pathogen-Infected Rice

The bacterial liquid cultured in Example 1-1 was inoculated with scissors on a rice plant grown on a Murashige and Skoog (MS) solid medium in a sterile transparent box at 28° C. under 24 hour light-dark cycle conditions (14 hours under light condition/10 hours under dark condition) for 1 week, and then cultured under the same conditions for 3 days. Three inoculated individuals of the same size and three healthy individuals as a comparative example were each transferred to a 20 mL glass bottle for GC analysis, and 1 mL of sterile water was added to the bottom of the glass bottle. The 20 mL glass bottle containing the plant was incubated under light condition for 24 hours and the volatile materials in the upper space of the sealed glass bottle were compared with those not infected with the pathogen. Sham individuals in which the leaf blades were cut-treated using sterile scissors were used as the uninfected individuals.

Specifically, volatile materials were collected from the upper end of the leaves at 50:30 μm divinylbenzene (DVB)/ carboxen (CAR)/polydimethylsiloxane (PDMS)-coated solid-phase microextraction (SPME) fiber (StableFlex 24Ga, Supelco, U.S.A.) at 25° C. for 60 minutes and then analyzed by gas chromatography/mass spectrometry (GC/ MS)(Agilent 7890A; MSD 5957C) using the HP-5MS capillary column (0.25 mm i.d.×30 m, film thickness 0.25 μm) (Agilent Technologies, U.S.A.).

The constituting components and contents of each extract were analyzed qualitatively and quantitatively by GC/MS, and the top ten components of each extract were selected and analyzed using the Wiley 8N Library program.

As a result, as shown in FIG. 6, limonene species showed the greatest increase among the terpenes which were increased by the inoculation of rice bacterial leaf blight (FIG. 6).

Example 2. Confirmation of Antibacterial Effect Against Pathogen of Rice Bacterial Leaf Blight The inhibitory effect of limonene and its derivatives, the contents of which increase in rice infected with rice bacterial leaf blight pathogen, against the growth of *Xanthomonas oryzae* pv. *oryzae* (*Xoo*) (i.e., a pathogen of rice bacterial leaf blight) were evaluated through Example 1.

Specifically, the experiment was prepared by plating *Xoo* on Wakimoto's Medium Without Potato (WF-P) solid medium (2% sucrose, 0.5% Bacto Peptone, 0.05% calcium nitrate, 0.082% sodium phosphate, 0.005% ferrous sulfate, 1.5% agar) followed by placing an 8 mm sterile paper disc thereon. Each of the limonene (S-(−)-limonene), carveol (L-carveol), and carvone (S-(+)-carvone) materials was treated onto the paper disc at a concentration of 10 mM, maintained in a 30° C. thermostat for 24 hours, and the degree of inhibition against the growth of Xoo was evaluated.

As a result, the inhibitory effect of limonene and its derivatives against the growth of Xoo was confirmed by treating them as shown in FIG. 1, and in particular, carveol and carvone showed a larger inhibition radius than that of limonene (FIG. 1).

In addition, limonene derivatives other than limonene, carveol, and carvone were evaluated for their inhibitory effect against the growth of Xoo.

Specifically, the experiment was prepared by plating Xoo on WF-P solid medium followed by placing an 8 mm sterile paper disc thereon. Each of the S-(−)-limonene, R-(+)-limonene, L-carveol, S-(+)-carvone, R-(−)-carvone, (+)-limonene oxide, (−)-limonene oxide, (S)-(−)-perillyl alcohol, α-terpineol, carvacrol, (−)-isopulegol, and (+)-isopulegol materials was treated on the paper disc at a concentration of 10 mM or 20 mM, respectively, maintained in a 30° C. thermostat under dark condition for 24 hours, and the degree of inhibition against the growth of Xoo was evaluated.

As a result, all of limonene and the derivatives of carveol, and carvone showed the inhibitory effect against the growth of Xoo as shown in FIGS. 2 and 3, and among them, L-carveol, (S)-(+)-carvone, and (R)-(−)-carvone showed particularly strong inhibitory effect against growth (FIG. 2).

Example 3. Confirmation of Antibacterial Effect with Regard to Pathogen of Rice Bacterial Leaf Blight Using Volatility An attempt was made to confirm whether limonene and its derivatives, the contents of which increase when rice is infected with rice bacterial leaf blight pathogen, have the effects of inhibiting the growth of Xoo by volatility effect through Example 1.

Specifically, a WF-P solid medium was prepared in one compartment of a biplate, in which media were divided by a partition, and 10 μL of Xoo, which was adjusted to an OD value of 0.5, was inoculated at intervals of 1 cm and a sterile 8 mm paper disk treated with a material was disposed on the opposite side. As in Example 2, the treatment with a material was performed such that S-(−)-limonene, R-(+)-limonene, L-carveol, S-(+)-carvone, R-(−)-carvone, (+)-limonene oxide, and (−)-limonene oxide were treated on paper discs at a concentration of 10 mM, maintained in a 30° C. thermostat under dark condition for 24 hours, and the degree of inhibition against the growth of Xoo was evaluated.

As a result, as shown in FIG. 4, the limonenes (i.e., (S)-(−)-limonene and (R)-(+)-limonene) showed no significant effect, however, L-carveol, (S)-(+)-carvone, and (R)-(+)-carvone showed strong inhibitory effect against the growth of Xoo by volatility, and the (−)-limonene oxide did not show a strong inhibitory effect against the growth but showed a larger area for the inhibitory effect compared to those of carveol and carvone (FIG. 4).

Example 4. Comparison of Antibacterial Effect with Regard to Pathogens of the Genus Xanthomonas An attempt was made to confirm whether limonene and its derivatives have an inhibitory effect against the growth of plant pathogens of the genus Xanthomonas other than Xanthomonas oryzae pv. oryzae by volatility effect through Example 3.

Specifically, experiments were performed in the same manner as in Example 3, for Xanthomonas fragariae (i.e., a pathogen of strawberry bacterial angular spot disease), Xanthomonas axonopodis pv. glycines (i.e., a pathogen of soybean bacterial pustule), and (i.e., a pathogen of rice bacterial leaf blight).

As a result, as shown in FIG. 5, it was confirmed that all of limonene (S-(−)-limonene), carveol (L-carveol), and carvone (S-(+)-carvone) were shown to have more specifically significant inhibitory effect against the growth of Xanthomonas oryzae compared to the growth of Xanthomonas fragariae and Xanthomonas axonopodis (FIG. 5).

Example 5. Confirmation of Inhibitory Effect on Magnaporthe oryzae, a Pathogen of Rice Blast The inhibitory ability of Magnaporthe oryzae, which is a pathogen of rice blast, was evaluated using L-carveol, S-(+)-carvone, R-(−)-carvone, (+)-limonene oxide, (−)-limonene oxide, (S)-(−)-perillyl alcohol, α-terpineol, carvacrol, (−)-isopulegol, and (+)-isopulegol of the present invention.

Specifically, a sterilized disc was placed on a potato dextrose agar (PDA) medium and Magnaporthe oryzae was inoculated on a spot 1.5 cm apart from the disc. Each of L-carveol, S-(+)-carvone, R-(−)-carvone, (+)-limonene oxide, (−)-limonene oxide, (S)-(−)-perillyl alcohol, α-terpineol, carvacrol, (−)-isopulegol, and (+)-isopulegol at a concentration of 500 mM (40 μl) was treated on top of the sterilized disc so as to confirm the growth inhibition of the pathogen. The treated medium was maintained in a 28° C. thermostat for 96 hours and the degree of growth inhibition was evaluated.

As a result, as shown in FIGS. 7 and 8, it was confirmed that limonene and the 10 kinds of volatile materials induced from limonene inhibited the growth of Magnaporthe oryzae (FIG. 7). Among them, S-(+)-carvone, R-(+)-carvone, (S)-(−)-perillyl alcohol, α-terpineol, and carvacrol showed 50% or higher inhibitory ability at the experimental concentrations (FIG. 8).

The invention claimed is:
1. A method for controlling rice blast caused by Magnaporthe oryzae, comprising:
 selecting a plant infected with Magnaporthe oryzae; and
 treating the plant infected with Magnaporthe oryzae with an effective amount of a composition comprising one or more limonene derivatives selected from the group consisting of compounds of Formula 1, Formula 2, Formula 3; and Formula 6, as an active ingredient,
 wherein Formula 1, Formula 2, Formula 3; and Formula 6 are set forth below:

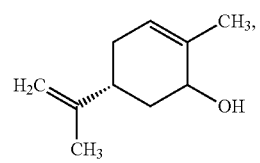

Formula 1

-continued

Formula 2

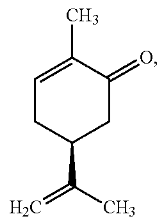

Formula 3 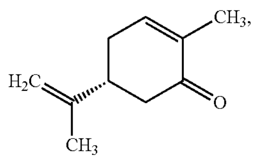 and

Formula 6 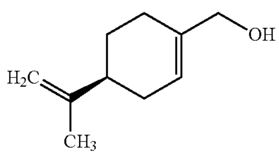 thereby controlling rice blast caused by *Magnaporthe oryzae* in the plant.

2. The method as set forth in claim 1, wherein treating the plant comprises directly spraying the composition on the plant or indirectly spraying the composition on the a plant by volatilization.

3. The method of claim 1, wherein the composition comprises an effective amount of the compound of Formula 1.

4. The method of claim 1, wherein the composition comprises an effective amount of the compound of Formula 2.

5. The method of claim 1, wherein the composition comprises an effective amount of the compound of Formula 3.

6. The method of claim 1, wherein the composition comprises an effective amount of the compound of Formula 6.

7. A method for controlling rice bacterial leaf blight caused by *Xanthomonas oryzae* pv. *Oryzae* (*Xoo*), comprising:

selecting a plant infected with *Xoo*; and treating the plant infected with *Xoo* with an effective amount of a composition comprising one or more limonene derivatives selected from the group consisting of compounds of Formula 3, Formula 7, Formula 9 and Formula 10 as an active ingredient, wherein Formula 3, Formula 7, Formula 9 and Formula 10 are set forth below:

Formula 3

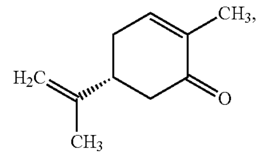

Formula 7

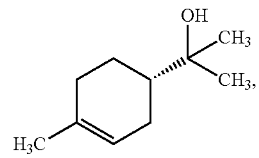

Formula 9 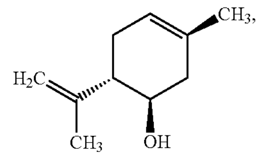 and

Formula 10 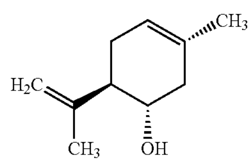 thereby controlling rice bacterial leaf blight caused by *Xoo* in the plant.

8. The method as set forth in claim 7, wherein treating the plant comprises directly spraying the composition on the plant or indirectly spraying the composition on the a plant by volatilization.

9. The method as set forth in claim 7, wherein the rice bacterial leaf blight is caused by *Xanthomonas oryzae* pv. *Oryzae* (*Xoo*).

10. The method of claim 7, wherein the composition comprises an effective amount of the compound of Formula 3.

11. The method of claim 7, wherein the composition comprises an effective amount of the compound of Formula 7.

12. The method of claim 7, wherein the composition comprises an effective amount of the compound of Formula 9.

13. The method of claim 7, wherein the composition comprises an effective amount of the compound of Formula 10.

* * * * *